May 1, 1923.
T. M. HOVELL
ANIMAL TRAP
Filed Aug. 31, 1921
1,453,796
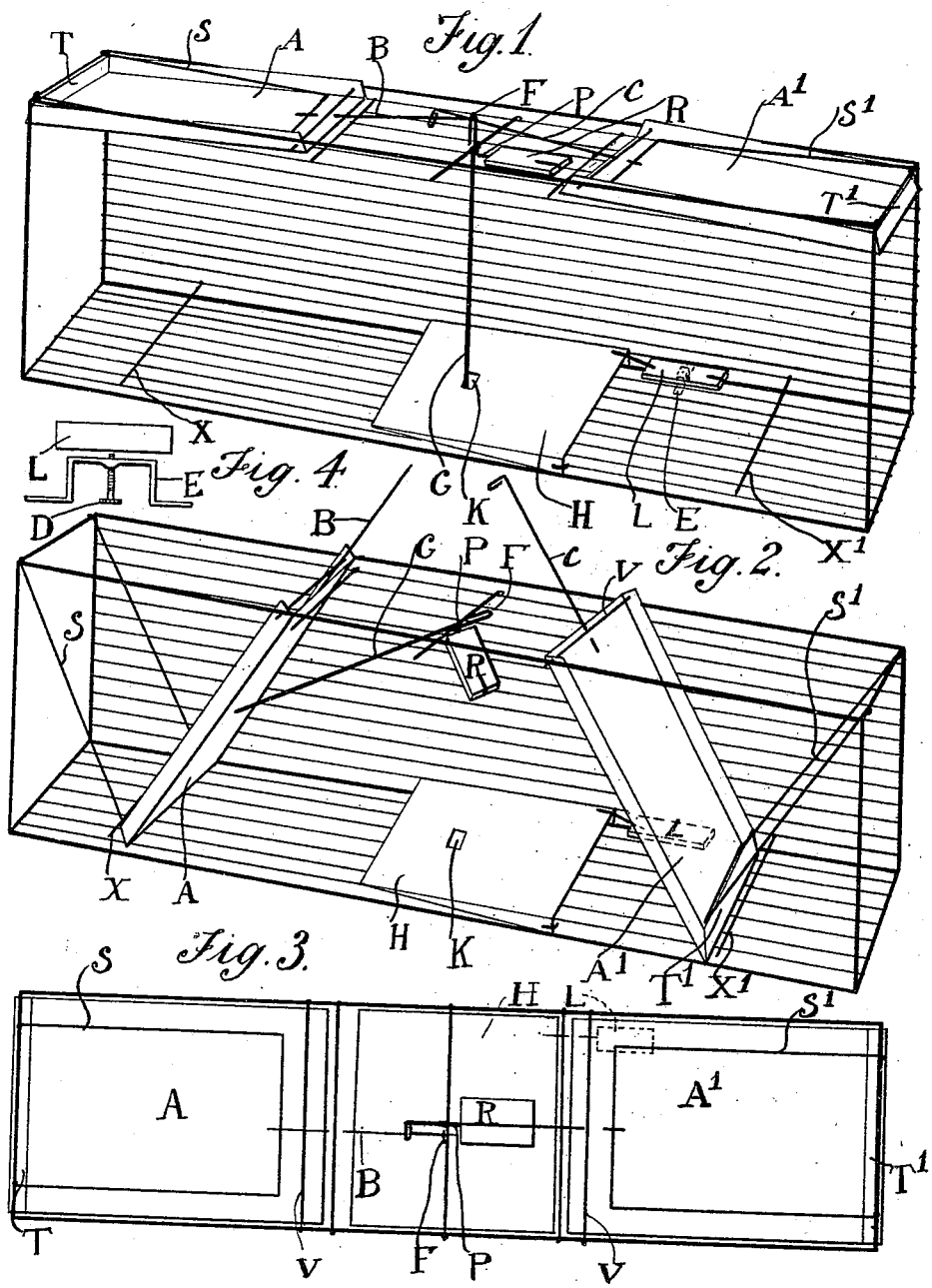
Inventor
Thomas Mark Hovell.
By his Attorney Patented May 1, 1923.

1,453,796

UNITED STATES PATENT OFFICE.

THOMAS MARK HOVELL, OF ELSTREE, ENGLAND.

ANIMAL TRAP.

Application filed August 31, 1921. Serial No. 497,279.

(GRANTED UNDER THE PROVISIONS OF THE ACT OF MARCH 3, 1921, 41 STAT. L., 1313.)

*To all whom it may concern:*

Be it known that I, THOMAS MARK HOVELL, Elstree, Herts, England, have invented certain new and useful Improvements in Animal Traps, for which I have filed application in England, 18th March, 1920, Patent No. 153,832, and of which the following is a specification.

This invention consists in improvements in and relating to animal traps of the cage variety with a door at each end, to be placed in the runs of animals, more especially rats.

The object of my invention is to provide a tripping mechanism which takes the form of a pivoted treadle or plate, preferably counterweighted, substantially horizontal and such that the weight of the animal when treading thereon causes it to move down sufficiently to disengage the lower extremity of the depending and approximately vertical arm of a three armed lever pivoted to turn upon a cross horizontal axis near the top of the trap, having a lateral arm carrying a counterweight, and an upward arm ending in a loop that, in the "set" position of the parts holds one of the door arms, which said door arm itself engages the other door arm.

In the accompanying drawings, Fig. 1 is a perspective view of the trap (the nearer side of the trap and the top between the doors being removed for convenience of illustration) showing the same when set and ready for use.

Fig. 2 is a perspective view (the nearer side and the top of the trap between the doors having been removed) of the trap, showing the same when the trap has been sprung.

Fig. 3 is a plan showing the arrangement of the setting mechanism as seen from above when the trap is set.

Fig. 4 is a detail view of the adjustable treadle-stop.

In carrying my invention into effect I construct an oblong enclosure having a door or doors A A¹ pivoted at each end on pivots V which fall by gravity assisted if desired by spring pressure. Attached to the upper end of each door is a rod, the end of which rod C on one door is bent horizontally at a right angle which enables the rod B on the opposite door to hold it down, the end of the rod B being retained in the loop F of the three-armed lever G F P R when the trap is set, thus enabling it to prevent the other rod C also from rising and the doors from falling.

The treadle H which for preference is placed lengthways, is counterweighted, the counterweight L for convenience placed to one side of the trap and rests on the adjustable screw D Fig. 4, attached to the supporting frame E which is fixed to the floor of the trap. The level of the counterweight is arranged so that when the screw D is withdrawn to the level of the upper surface of its supporting frame E the treadle is horizontal. The use of the screw D is to enable the setting of the trap to be adjusted by depressing the free edge of the treadle and thus diminishing the contact support of the vertical arm G of the lever G F P R to be presently described so that even a light weight such as that of a young animal will spring the trap as readily as the heavier weight of an older animal and enable a wary animal to be caught, who would be frightened by a coarse movement of the treadle and escape without springing the trap.

The three-armed lever G F P R is pivoted to a transverse bar at or near the roof of the trap and the vertical arm G when the trap is set rests against the edge of an aperture K made in the treadle. The upper arm terminates above in a loop F which when the trap is set retains the rod B and thus keeps the doors supported. From beneath the loop F the arm P projects more or less horizontally and has a weight R at its extremity. When the treadle is depressed as by an animal passing over it, the vertical arm G is released from its contact with the edge of the aperture in the treadle, and the counterweight R then falls and drags the loop F away from the end of the rod B and thus allows the rod B to rise and with it the rod C and thus the doors to fall.

To prevent the doors from being raised by an imprisoned animal, a piece of wire S $S^1$ bent as shown in the drawings is pivoted to the end cross piece of the frame of the trap and rests on the corresponding door while the trap is set. When the trap is sprung, the wire S falls with the door until its end is arrested by coming into contact with the turned up extremity T $T^1$ of the door and thus the door is kept shut until the wire is lifted up.

To further prevent the escape of a small animal a transverse bar X $X^1$ commonly known as a baulking bar is placed across the trap just external to the position occupied by the closed door, so that when the door is lifted to the extent which must be allowed to give the catch S play the bar is across the space created between the lower edge of the door and the bottom of the trap.

Although I have described above the preferred embodiment of my invention, it is to be understood that it is not limited thereto, but includes all forms of traps falling within the scope of the claim.

What I claim as my invention and desire to secure by Letters Patent of the United States is:—

An animal trap comprising a wire frame; pivotally mounted doors secured at the top of and near the ends of said frame; a lever pivoted at the top of said frame, and midway between said doors, said lever having a counter weight thereon; guards pivotally secured at the top of and at the ends of said frame, the free end of said guard being adapted to be associated with said doors; rods on said doors for association with said lever; and means for releasing said lever so that said doors will drop and said guards will lock the doors in place.

In witness whereof I have signed this specification in the presence of two witnesses.

T. MARK HOVELL.

Witnesses:
 R. HADDAN,
 A. MORRELL.